United States Patent [19]

Medina-Vega et al.

[11] Patent Number: 5,525,576

[45] Date of Patent: Jun. 11, 1996

[54] SEED HULL EXTRACT ASSIMILATION AGENTS FOR AGROCHEMICAL COMPOSITIONS

[76] Inventors: Luis R. Medina-Vega, Diego de Vilchis No. 2956, Chihuahua, Mexico; Joseph A. Hickey, 4608 Darcin Dr., Lakeland, Fla. 33813; Lewis E. Dillon, 128 E. Shasta, McAllen, Tex. 78504

[21] Appl. No.: 312,990

[22] Filed: Oct. 3, 1994

Related U.S. Application Data

[63] Continuation-in-part of Ser. No. 775,460, Oct. 15, 1991, Pat. No. 5,352,264.

[51] Int. Cl.$^6$ .............................. A01N 25/02; A01N 65/00
[52] U.S. Cl. .................... 504/116; 504/177; 504/206; 504/211; 504/212; 504/213; 504/215; 504/248; 504/292; 504/299; 504/353; 504/354; 504/214; 514/231.2; 514/477; 514/783; 514/784; 514/946; 71/DIG. 1

[58] Field of Search ................ 71/DIG. 1; 514/231.2, 514/477, 783, 784, 946; 504/353, 248, 206, 211, 212, 213, 214, 215, 292, 299, 354, 116, 177

[56] References Cited

U.S. PATENT DOCUMENTS

| | | | |
|---|---|---|---|
| 2,362,390 | 11/1944 | Millar | 71/25 |
| 3,259,501 | 7/1966 | Ulrey | 99/2 |
| 4,007,258 | 2/1977 | Cohen et al. | 424/22 |
| 4,436,547 | 3/1984 | Sampson | 71/76 |
| 4,579,579 | 4/1986 | Kerr | 71/23 |
| 4,698,090 | 10/1987 | Marihart | 71/24 |
| 5,352,264 | 10/1994 | Medina-Vega | 71/23 |

*Primary Examiner*—S. Mark Clardy
*Attorney, Agent, or Firm*—Banner & Allegretti

[57] ABSTRACT

The efficacy of plant growth regulating agents and systemic insecticides for plants are enhanced by applying the agent in combination with a product from the oxidation of a hull-free, pentose-containing extract from seed hulls.

16 Claims, No Drawings

SEED HULL EXTRACT ASSIMILATION AGENTS FOR AGROCHEMICAL COMPOSITIONS

This is a continuation-in-part of application Ser. No. 775,460 filed Oct. 15, 1991 and now U.S. Pat. No. 5,352,264.

FIELD OF THE INVENTION

The present invention relates to combinations of: (a) an assimilation agent consisting essentially of an oxidized seed hull extract containing a blend of carbohydrates and derived polyhydroxy carboxylic acids; and (b) a plant growth regulating agent and/or systemic insecticide and fungicide for plants for enhanced assimilation into a plant treated with the mixture.

BACKGROUND OF THE INVENTION

A number of active agents are applied to the exterior surfaces of plants for the purpose of affecting or protecting the plant. Plant growth regulating agents are applied for killing the plant or regulating (e.g., stunting or encouraging) its growth activity. Plant growth regulating agents encompass those agents known to act as herbicides as well as those acting as fertilizers and plant growth hormones. Systemic insecticides for plants are applied to protect the plant against insect damage.

Almost all externally applied active agents must first enter the plant metabolism through various transport and absorption mechanisms before the agent can have its intended effect. The absorption and assimilation of the applied agents is hindered by a natural waxy outer coating on most plant external surfaces. In general, agents that are not readily assimilated into the plant require higher application rates or must be applied in combination with agents that increase the residence time on the foliage to accommodate a slower assimilation rate. Neither solution is entirely satisfactory since both higher application rates and increased residence times on the plant foliage present increased risks of environmental contamination as well as increased risks to the applicators. Indeed, some otherwise useful herbicides and plant growth regulating agents have received maximum application rate limits due to such problems.

Surfactants have been commonly used to increase the wetted surface area of the plant's outer surface. The increased area thus increases the absolute amount of applied agent that is absorbed in a unit of time. The most commonly used surfactant for plant growth regulating agents is a product known as ORTHO X-77™ containing 70–75% ethoxylated octylphenol, 15% free fatty acids, and 10% isopropanol. It is believed that the isopropanol component of X-77™ partially dissolves the waxy outer coating to permit the applied agents to more easily penetrate into the plant tissues. Isopropanol, however, poses certain risks of flammability in use and in product storage.

It would be desirable to have a means for reducing the amount of active agents that are applied to the external surfaces of plants without sacrifice in efficacy.

It would also be desirable to have a means for increasing the efficacy of externally applied active agents when used at the same application rate as is conventionally used.

SUMMARY OF THE INVENTION

It is an objective of the invention to provide a means for reducing the amount of externally applied plant growth regulating agents and systemic insecticides and fungicides for plants without sacrifice in efficacy.

It is also an objective of the present invention to provide a means for increasing the efficacy of externally applied plant growth regulating agents and systemic insecticides and fungicides for plants at the same application rate as is conventionally used.

It is another objective of the invention to provide a method for producing a natural mixture of Krebs cycle acids and their associated carbohydrates.

In accordance with these and other objectives of the invention which will become apparent from the description herein, compositions according to the invention comprise (1) an assimilation agent consisting essentially of an oxidized seed hull extract containing a blend of carbohydrates and derived polyhydroxy carboxylic acids; and (2) an active agent containing a plant growth regulating agent or a systemic insecticide or fungicide for plants.

The present invention is directed to the discovery that the assimilation agents improves the assimilation properties of plant growth regulating agents and systemic insecticides into plant metabolic processes. When the extract and an active agent are applied in combination, lower levels of such active agents can be used to achieve at least the same level of efficacy compared to the previously used higher rates. Less chemicals are thereby required to achieve the same level of performance with an attendant reduction in hazards associated with human exposure to treated areas and environmental release.

DETAILED DESCRIPTION OF THE INVENTION

The present invention relates to the combination of: (1) an assimilation agent consisting essentially of an oxidized seed hull extract containing polyhydroxycarboxylic acids associated with the Krebs citric acid cycle and carbohydrates related thereto; and (2) an active agent containing either a plant growth regulating agent or a systemic insecticide or fungicides for plants. This combination of ingredients exhibits an enhanced assimilation of the active agent into the plant's metabolic cycle for efficient transport throughout the plant. Use of the synthetic Krebs cycle acids (see, e.g., Sampson U.S. Pat. No. 4,436,547) in place of the present extract does not realize the same level of intraplant transport or beneficial growth effects.

The assimilation agent of the invention is obtained as a mixture from the two stage oxidation of pentose-containing extract from seed hulls as described in copending application Ser. No. 07/775,460 which was filed on Oct. 15, 1991 now U.S. Pat. No. 5,352,264 the disclosure of which is herein incorporated by reference. Briefly described, a seed hull extract according to the invention is prepared by a process comprising and preferably consisting essentially of: (a) contacting seed hulls with nitric acid (preferably a concentration within the range of about 4–6%) to hydrolyze pentosan polymers in said hulls to form a pentose-containing extract; (b) agitating said extract with steam at a temperature below the boiling point of water (preferably within the range of 75°–85° C. for about 8–20 hours) to oxidize at least in part pentoses from said hulls into polyhydroxycarboxylic acids and form a first oxidized extract stream; (c) separating the seed hull solids from the first oxidized extract to avoid further oxidation and extraction of materials from the solids and form a clarified extract; (d) contacting the clarified extract with additional nitric acid to oxidize at least in further part the clarified extract into a second oxidized product stream containing a blend of carbohydrates and derived polyhydroxy carboxylic acids; and (e) concentrating the second oxidized product stream at a temperature of no more than 60° C. (preferably no more than 45° C. by vacuum distillation) to produce a concentrated product containing, and preferably consisting essentially of, polyhydroxycarboxylic acids and carbohydrates related thereto.

Acids that can be found in the oxidized extract of the invention include mixtures of succinic acid, malic acid, glycollic acid, glyceric acid, xylonic acid, oxalic acid, malonic acid, adipic acid, and glutaric acid. The polyhydroxycarboxylic acids are related to hydroxyglutaric acid. The carbohydrates in the extract include trioses and hexoses.

If desired, the concentrated seed hull extract of the invention can be enhanced by the addition of one of more synthetic Krebs cycle acids to increase the amount of active acids from about 2–4% to greater than 15–40 wt %.

Seed hulls that can be used as a source for extraction are preferably hulls that exhibit a glucoxylane hemicellulose type of structure. Hemicellulose is a type of cellular membrane differing from cellulose and is easier to extract with alkali or by hydrolysis with mineral acids and producing primarily pentoses with some hexoses. Such hulls include rice hulls, oat hulls, corn hulls, cotton hulls, and virtually any other such pentose-containing hull, either alone or in combination. A preferred material for the extraction is glucoxylane type hemicellulose such as rice or oat hulls producing a dilute product mixture that can be recognized by the properties described in Table 1 after oxidation and clarification in accordance with the invention.

TABLE 1

| | |
|---|---|
| Appearance and odor | Yellowish-clear solution having the odor of fermented glucose |
| Boiling Point | 107–109° C. at 760 mm Hg |
| Density | 1.020–1.040 g/cc at 20° C. |
| Total carboxylic acids | 2.5–3.5% (expressed as trihydroxy-pentanedioic acid) |
| Nitric acid | Maximum of 1% |

Virtually any conventional method can be used to contact the seed hulls with the nitric acid. Although any extraction process can be used, exemplary batch methods include spray percolation, full immersion, and intermittent drainage of nitric acid through a bed of seed hull solids. Exemplary continuous contacting methods include multistage concurrent or countercurrent extraction sequences, moving bed percolation, tilting pan filters, and horizontal filters. The preferred contacting method is a batch, full immersion process in a pressurizable container.

After extraction, seed hull solids must be separated from the extract solution to avoid further reaction or extraction in the subsequent oxidation step which have a material, adverse effect on the basic and novel assimilation-enhancing effects of the clarified extract. The separation can be accomplished by any of the conventional liquid-solid separation processes including centrifugation, filtration, straining, sedimentation, decantation, and hydrocyclone separation either alone or in serial combination. The preferred separation method is decantation followed by centrifugal separation.

Dilute rice hull extract product mixture substantially free of seed hull solids is concentrated by vacuum evaporation at a pressure within the range from about 145 mm Hg to about 200 mm Hg at a maximum temperature within the range from about 45° C. to about 60° C. These conditions are selected to avoid further conversion or oxidation of the carbohydrates and acids in the product solution.

Although the exact mechanism of action is not completely known, evidence suggests that the combination of acid and the related carbohydrate has a number of complex, inter-related effects on plants. The activities identified to date relate the carboxylic acid-containing component to (a) enhanced movement of a simultaneously applied active agent into and through the plant via an interaction with the plant's metabolic cycles; (b) stomatal opening processes with enhanced water uptake efficiency; (c) plant metabolism modifications affecting nutrient and carbohydrate transportation and transformation in the plant; and (d) modifications in the fruiting characteristics as well as post-harvest behavioral changes.

Acids associated with the Krebs citric acid cycle that can be found in oxidized extract of the present invention include mixtures of citric acid, cis-acotinic acid, isocitric, oxalosuccinic, $\alpha$-ketoglutaric acid, trihydroxyglutaric acid, succinic acid, fumaric acid, malic acid, oxaloacetic acid, pyruvic acid, lactic acid, glycolic acid, and 2,3,4-trihydroxypentanedioic acid. Generally, the oxidized extract of the invention contains at least one of the polyhydroxycarboxylic acids related to hydroxy glutaric acid. The carbohydrates related to the acids in the oxidized extract usually also include trioses pentoses and hexoses.

Generally, the acid and associated carbohydrate are applied to the external surfaces of plants at an application rate within the range from about 0.5 ounces per acre to about 10 ounces per acre, preferably within the range from about 1–5 ounces per acre at an active ingredient concentration within the range of about 4–6 wt %. The specific application rate will depend on the active agent being applied, and is thus readily determinable with the exercise of no more than the existing level of skill in this art.

A combination of the acid and carbohydrate, as described above, facilitates transfer of applied active agents into the plant metabolism independent of the plant growth regulating agent chemistry. As such, the acid/carbohydrate combination of the invention is not properly characterized as a "synergist" for a specific plant growth regulating agent or systemic insecticide because the enhanced effects are due to intraplant transfer rather than unique attenuation of any particular active ingredient.

The plant growth regulating component of the present invention can include, inter alia: plant growth enhancing amounts of at least one of the 84 identified gibberillins with $GA_3$, $GA_4$, $GA_5$, $GA_7$ and $GA_9$ being the preferred gibberillins for use in the present invention, cytokinins (e.g., zeatin, kinetin, benzyladenine, dihydrozeatin, and isopentenyl adenine), auxins (e.g., indoleacetic acid (IAA), indolebutyric acid (IBA), and naphthalenacetic acid (NAA)); sodium ortho-nitrophenolate; sodium para-nitrophenolate; sodium 5-nitro-guaicolate; polyhydroxycarboxylic acids of 2, 4, 5, and 6 carbon structures that are not associated with the Krebs cycle; a growth stunting amount of mepiquat chloride; a lethal amount of either glyphosate or sulfosate; a growth enhancing amount of bacillus subtilis; and a sulfonyl-urea herbicides; and systemic fungicide (e.g., tridemorph).

A preferred form of mepiquat chloride is a sodium-free form made by contacting chloromethane with N-methylpiperidine in acetone for a time sufficient to precipitate solid mepiquat chloride.

Suitable systemic insecticides for plants that benefit from the present invention include, inter alia, aldicarb. Other systemic insecticides and other translocated active ingredients which can be used in the present invention are apparent to those with no more than the existing level of skill in the art.

EXAMPLES

The following examples will serve to illustrate a process for preparing the assimilation agent used in the invention.

Example 1

Example 1 describes a method for producing concentrated extract according to the invention. An extraction vessel loaded with 2,250–10,000 kg of ground rice hulls and/or oat hulls having a size within the range from about 24–90 mesh would be contacted with 8,000 to 38,000 liters of water and 700–3,300 kg of nitric acid (54–60% $HNO_3$) under steam agitation to remove an aqueous pentose-containing extract. Preferably, the weight ratio of hull solids to nitric acid solution is within the range from about 0.1 to about 0.5, even more preferably within the range of 1:3 to 1:5. The steam pressure would be maintained in a range from 7 to 9 k/cm$^2$ at a temperature that did not exceed 70°–85° C.

Hull solids are then separated from the pentose-containing extract stream without significant change in temperature. Such separation is required to prevent further extraction of materials and further reaction with the solids in the subsequent contacting steps, the reactants of which have a material, adverse influence on the assimilation-enhancing properties of extract that is oxidized in the absence of significant quantities of the hull solids. The separation can be accomplished by any of the conventional liquid/solid separation methods.

When the solids have been separated, 475–2,200 kg (preferably 800–1500 kg) of additional nitric acid solution is added to the pentose-containing extract solution and held at temperature for 4 to 20 hours (preferably 8–14 hours) to yield a dilute product mixture containing about one or more acids associated with the Krebs cycle including 2,3,4-trihydroxypentanedioic acid, and various polyhydroxycarboxylic acids having the general formula $HOOC-(CHOH)_n-COOH$ where n is 3, 4, or 5; pentose-derived carbohydrates; with the remainder containing various lignins type compounds.

Concentration of the dilute product can be performed by passing the dilute product mixture to an ascending film vacuum evaporator at a pressure within the range of about 140–200 mm Hg absolute to increase the product concentration to about 4.5–5.5 wt % total acids. The vacuum evaporator lowers the solution boiling point to about 45°–60° C. Steam can be added to maintain a temperature of less than 60° C. if needed. The concentrated product will have a pH within the range from about 1.5 to 2.5 with a specific gravity within the range from about 1.06 to 1.08 g/cm$^3$ at 20° C.

Concentrated product should be treated to remove suspended solids and objectionable coloration by virtually any conventional liquid-solids separation process. Contact with activated carbon for 0.5–2 hours at 40°–60° C. with agitation is preferred for removing undesirable colors from the product. Addition of a flocculating agent (e.g., a polyacrylamide) followed by period of quiescent settling and decanting are preferred steps to remove suspended solids from the concentrated product solution.

Example 1A

The product can also be treated with calcium for treating plants with particularly high calcium needs. Calcium hydroxide or calcium chloride can be added to the product in a quantity sufficient to produce a pH within the range from about 6.0–8.0 rubber lined reactor. Calcium nitrate can be added to further raise the calcium content of the product if desired. Depending on the amount of calcium added, the resulting product can have variable calcium content. Preferred calcium concentrations are up to about 8.5 wt % with products having 1–5 wt % calcium being useful where lower concentrations are useful and products having 7.8–8.5 wt % being useful for high calcium needs. The preferred temperature for forming the calcium-containing product is about 60° C.

Example 1B

The ammonium form of the product can be made by permitting ammonia gas to bubble through the product for making a solution that is particularly beneficial for plants having high nitrogen needs. Sufficient ammonia is added to result in a product solution having a pH within the range from about 6–8. The preferred temperature for forming the nitrogen-containing product is about 60° C.

Example 1C

If desired, the acid content of the product may be raised by adding 0.5–20 wt %, preferably 1–10 wt % each of one or more of the naturally-occurring dicarboxylic acids, e.g., oxaloacetic, glutaric, malic, and citric acids. The preferred acid concentration in the acid-adjusted product is within the range from about 4.5–5.5 wt % (PHCA™) for applications such as fruit filling. High acid products containing 40–45 wt % total carboxylic acids (KREBSOL™) can be made for high acid applications such as bioregulator auxiliary.

Example 1D

The product can be treated with potassium to provide a product particularly beneficial for plants having need for potassium. Potassium hydroxide that has been neutralized with acetic acid alone or in combination with potassium acetate can be added to provide a product having 8–15 wt % calculated as $K_2O$. Preferably, the carboxylic acid content is adjusted to be within the range from about 2.5–3.5 wt %.

Example 1E

A variety of other inorganic additives can also be used to modify the product. Boron salts can be added to make products having 0.3–0.5 wt % B in the product for application to plants requiring prevention of deficiencies. Iron, copper, manganese, magnesium, and zinc sulfates can be added as well as a water soluble boron salt in levels within the range from about 0.1–2.5 wt % of each mineral nutrient.

Example 1F

If a solid product is desired, the oxidized extract can be combined with virtually any form of absorbent solids which can act as a carrier. In a preferred embodiment, the concentrated extract is fortified with dicarboxylic acids to a level within the range from about 12–13 wt % of total carboxylic acids and 3.5–4 wt % carbohydrates. Spent rice and/or oat hulls that were previously removed from the extract before the oxidation step serve as a convenient absorbent carrier and are recombined with the oxidized extract. Urea, glucose, gypsum, and calcium hydroxide are then added to neutralize the mixture to a pH within the range of 5.5–6.5 as well as to aid in the formation of the final granules. The granules are then sized to 8–14 mesh (1.19–2.38 mm) in size.

In each of the following examples, extract according to example I was used as the source of the carboxylic acid and associated carbohydrate.

Examples 2–4

Extract 2A was prepared by the process of the invention using rice hulls exhibiting 4.5–5.5 wt % total polyhydroxycarboxylic acids expressed as trihydroxypentanedioic acid.

Extract 2B was prepared by a similar process except that the rice hulls were not separated before the addition of the supplemental nitric acid for the second oxidation stage. Extract 2B exhibits 1.5–2.5 wt % total carboxylic acids and is used commercially as a soil amendment for loosening clay containing soils.

Extracts 2A and 2B were applied to plant foliage at equivalent active carboxylic acid rates. In greenhouse tests, four liter pots were filled with inert substrate. Tomato plants were transplanted into the test pots at the fourth true leaf stage of growth and irrigated with the same nutrient solution. Treatments with extract 2A or extract 2B were applied to the foliage every 10 days after the eighth true leaf stage and up to the third cut. Fifteen replications were used for each extract. Five pots were sampled at fruit setting for plant mass. The remaining 10 pots were used to evaluate yield.

TABLE 2

| Example | Treatment | Rate (pints per acre) |
|---|---|---|
| | Control | — |
| 2 | Extract 2A | 2.58 |
| 3 | Extract 2B | 2.58 |
| 4 | Extract 2B | 1.03 |

TABLE 3

| | Dry Weight (g/plant) | | | |
|---|---|---|---|---|
| Example | Root | Meristem | Stem + Leaves | Total |
| control | 1.3 a | 3.2 a | 17.1 a | 21.6 b |
| 2 | 1.7 a | 3.5 a | 24.6 a | 29.8 a |
| 3 | 1.4 a | 3.6 a | 16.7 b | 21.7 b |
| 4 | 1.6 a | 3.2 a | 18.1 b | 22.9 b |

Extracts 2A and 2B differed significantly in the total plant mass and the sum of stem and leaf mass. Extract 2A produced statistically more plant mass overall and in the stems and leaves. There was no statistical difference among the treatments or the control in root and meristem weights. (Means within columns followed by the same letter are not significantly different at the 5% level of probability.)

The yield of tomatoes was statistically better for extract 2A than for extract 2B with correspondingly higher potassium and magnesium contents. The calcium content of the tomatoes treated with extract 2A are considered to be statistically equivalent to those from treatment with extract 2B at the same application rate. As reflected by the equivalent numbers of fruits per plant, the plant response to treatment with extract appears to manifest in fruit filling rather than fruit setting. See, Tables 4 and 5, respectively.

TABLE 4

| | Yield | |
|---|---|---|
| Example | g/plant | fruit/plant |
| control | 305.1 b | 16.8 a |
| 2 | 502.4 a | 17.6 a |
| 3 | 344.8 b | 16.5 a |
| 4 | 295.8 b | 14.7 a |

TABLE 5

| | Nutrient Content (mg/plant) | | |
|---|---|---|---|
| Example | Ca | K | Mg |
| control | 271.6 c | 806.4 b | 139.7 b |
| 2 | 345.7 a | 1059.3 a | 179.3 a |
| 3 | 321.4 ab | 847.2 b | 152.5 b |
| 4 | 272.1 bc | 792.5 b | 151.0 b |

Example 5

Sulfosate (Touchdown™) was tested for control over bahiagrass (*Paspalum notalium*) in a formulation with the commercially available surfactant, ORTHO X-77™, and with assimilation agent prepared according to example 1. Bahiagrass is a weed found in citrus groves that is eliminated to conserve water for the citrus fruit. Thus, the speed with which the bahiagrass is controlled is important.

The application rate of the sulfosate in this example was 50% of the suggested label rate for control of bahiagrass, i.e., 1 lb active ingredient per acre (0.11 $g/m^2$). At this lower application rate the effectiveness of surfactant and assimilation agent can be more readily determined. The surfactant and the assimilation agent were applied at 0.5 vol % and 1 vol % rates.

Each of the 24 test plots was 600 $ft^2$ (55.7 $m^2$) with 4 replications of 6 treatments at a weed height of 6 inches (152 mm). The weather was clear, 85° F. (29° C.), and 50% relative humidity. Each mixture was applied to the plant surfaces with a boom sprayer mounted on a tractor.

Control over the bahiagrass was measured weekly for four weeks and then at 6 and 9 weeks. The results are shown in Table 6.

TABLE 6

| | Control % at Weeks After Treatment | | | | | |
|---|---|---|---|---|---|---|
| Treatment | 1 | 2 | 3 | 4 | 6 | 9 |
| TOUCHDOWN ™ | 5 | 20 | 30 | 40 | 40 | 30 |
| TOUCHDOWN ™ + 0.5% X-77 ™ | 10 | 50 | 70 | 75 | 75 | 70 |
| TOUCHDOWN ™ + 1% X-77 ™ | 10 | 50 | 70 | 75 | 75 | 70 |
| TOUCHDOWN ™ + 0.5% assimilation agent | 20 | 80 | 80 | 85 | 80 | 75 |
| TOUCHDOWN ™ + 1% assimilation agent | 20 | 80 | 80 | 85 | 80 | 75 |
| Untreated control | 0 | 0 | 0 | 0 | 0 | 0 |

Examination of the results in Table 6 show that the level of control did not differ between the 0.5% and 1% application rates of each of the X-77™ and the present assimilation agent, i.e., even 0.5% of each was more than sufficient and 1% showed no additional benefits. Even the overall level of control was close between the extract of the invention and the X-77™ surfactant (75% v. 70%). Where the products differed, however, was in the speed in which control was realized. Treatment with the extract showed a higher level of control (80% v. 50%) in the 2 weeks after application. The water savings associated with quickly controlling bahiagrass is an important economic benefit for citrus growers.

Example 6

Bahiagrass and broadleaf weeds (Florida pusley, lambsquarter, ragweed, pigweed, jerusalem oak, and spanish needles) were controlled in citrus groves with TOUCHDOWN™ and a commercially available herbicide, ROUNDUP™, containing a lethal amount of glyphosate (N-(phosphonomethyl)glycine) as the active ingredient and about 15–20 wt % of N,N-bis-2-(omega hydroxypolyethylene) ethylalkylamine with a polyoxyethylene content of 3–60 moles of ethylene oxide as a mildly cationic ethoxylated amine surfactant added by the manufacturer. The X-77™ and extract from example 1 were both added to the spray mix at the rate of 0.25 vol %.

The application rate of each herbicide was 1 lb. active ingredient per acre (0.11 g/m$^2$). ROUNDUP™ has a recommended application rate of 0.3–1.0 lb/acre for annual weed species and 1.0–4.0 lb/acre for control of perennial weed species. Generally 1.5–2.0 lb/acre is thought to be adequate for most perennial weeds.

Each of the 28 test plots was 500 ft$^2$ (46.5 m$^2$) with 4 replications of 7 treatments at a weed height of 8–10 inches (203–254 mm). The weather was partly cloudy, 90° F. (32° C.), and 70% relative humidity. Each mixture was applied to the plant surfaces with a boom sprayer mounted on a tractor.

Bahiagrass control was measured weekly for four weeks and then at 6, 9, and 12 weeks after treatment. The control results for bahiagrass are reported in Table 7.

TABLE 7

| Treatment | Control % at Weeks After Treatment | | | | | | |
|---|---|---|---|---|---|---|---|
| | 1 | 2 | 3 | 4 | 6 | 9 | 12 |
| TOUCHDOWN™ | 5 | 20 | 40 | 40 | 40 | 20 | 10 |
| TOUCHDOWN™ + 0.25% X-77™ | 15 | 30 | 80 | 85 | 80 | 80 | 60 |
| TOUCHDOWN™ + 0.25% assimilation agent | 20 | 50 | 95 | 95 | 95 | 90 | 80 |
| ROUNDUP™ | 10 | 30 | 50 | 50 | 45 | 30 | 15 |
| ROUNDUP™ + 0.25% X-77™ | 15 | 35 | 80 | 85 | 80 | 80 | 60 |
| ROUNDUP™ + 0.25% assimilation agent | 20 | 50 | 95 | 95 | 95 | 90 | 80 |
| Untreated control | 0 | 0 | 0 | 0 | 0 | 0 | 0 |

Both TOUCHDOWN™ and ROUNDUP™ showed faster control at higher levels throughout the test despite the low level (0.25 vol %) of applied assimilation agent. It should be noted that maximum control was reached at 3 weeks with control beginning to decline at 9 weeks as regrowth began.

Broadleaf weeds were also controlled in citrus groves with the same application rates and conditions as the bahiagrass tests of this example. The results are reported in Table 8.

TABLE 8

| Treatment | Control % at Weeks After Treatment | | | | | | |
|---|---|---|---|---|---|---|---|
| | 1 | 2 | 3 | 4 | 6 | 9 | 12 |
| TOUCHDOWN™ | 10 | 30 | 60 | 60 | 60 | 50 | 5 |
| TOUCHDOWN™ + 0.25% X-77™ | 15 | 40 | 90 | 80 | 70 | 60 | 25 |
| TOUCHDOWN™ + 0.25% assimilation agent | 20 | 50 | 100 | 100 | 80 | 60 | 20 |
| ROUNDUP™ | 10 | 40 | 80 | 80 | 70 | 50 | 5 |
| ROUNDUP™ + 0.25% X-77™ | 15 | 40 | 90 | 85 | 75 | 60 | 25 |
| ROUNDUP™ + 0.25% assimilation agent | 20 | 50 | 100 | 100 | 80 | 60 | 25 |
| Untreated control | 0 | 0 | 0 | 0 | 0 | 0 | 0 |

The results in Table 8 show that assimilation agent prepared according to the Example 1 results in 100% broadleaf control in three weeks with higher levels of control throughout the test period.

Example 7

Cotton plants were treated with a systemic pesticide commercially available under the name TEMIK™ containing aldicarb as the active ingredient. The function of a systemic insecticide is to move through the plant tissues saturating the tissues to a level sufficient to control the population of predatory pests feeding on the affected plant tissues. Usually, control is through the use of amounts of insecticide that kills insects feeding on the plant tissues. Because the systemic insecticide aldicarb in not known to exert a plant growth regulating effect, any increased yields exhibited after treatment are the effects of reduced plant tissue damage from pests.

The test was conducted in three repetitions over 50 foot (15.24 m) cotton rows. TEMIK™ was applied at the prescribed rate of 12 lb/acre (1.32 g/m$^2$). The granular form of the assimilation agent according to example 1F was applied at the rate of 25 lb/acre (2.75 g/m$^2$). The averaged results are shown in Table 9.

TABLE 9

| Product | Cotton Yield (Bales/acre) | Plant Height (ft) | Scars (number per plant) | Pests (number per plant) |
|---|---|---|---|---|
| Control | 0.38 | 0.11 | 1.28 | 0.36 |
| TEMIK ™ | 0.75 | 0.23 | 0.44 | 0.20 |
| TEMIK ™ + assimilation agent | 1.10 | 0.27 | 0.2 | 0.12 |

From Table 9, it is clear that the combination of the insecticide and the present assimilation resulted in higher cotton yields, lower numbers of scars, and lower numbers of pest counts per plant. These effects are characteristic of enhanced plant uptake, transport, and assimilation of insecticide into the plant tissues.

Because systemic insecticides have no inherent plant growth regulating effects and the extract-containing results in both examples 6 and 7 showed enhanced effects with different active ingredients, one must conclude that the extract is affecting plant transport mechanisms rather than acting as a synergistic agent that attenuates specific chemical species.

Example 8

Example 8 shows that the assimilation agent is enhancing plant transport mechanisms. Tomato and bell pepper plants were grown in a greenhouse under normal growing conditions for each plant. Upon reaching 4–6 inches (102–152 mm) in height, the plants were treated with 2 quarts/acre of a conventional 12-6-8 foliar fertilizer. Dilute extract of example 1 at a rate corresponding to 1 pint/acre and concentrated extract of example 1 at a rate corresponding to 2 ounces/acre were each applied. Ten days after the treatment, foliar samples were analyzed for nutrients. The results of the analysis are in Table 10.

TABLE 10

| Treatment | N-NO3 | P-PO4 | % K | % Ca | % Mg | Fe | Zn | Mn | Cu | B |
|---|---|---|---|---|---|---|---|---|---|---|
| Control | 680 | 2470 | 2.43 | 1.71 | 0.65 | 100 | 28 | 78 | 20 | 24 |
| Dilute assimilation agent | 1080 | 2800 | 3.08 | 1.80 | 0.70 | 110 | 33 | 81 | 22 | 27 |
| Concentrated assimilation agent | 1120 | 2880 | 3.10 | 1.81 | 0.75 | 105 | 37 | 85 | 25 | 32 |

From table 10, both the concentrated and diluted forms of the extract of the present invention exhibited elevated levels of all nutrients despite rather significant differences among them.

Example 9

In example 9, assimilation agent of the invention is used to increase uptake of a plant growth regulator. The plant growth regulator, mepiquat chloride, has been marketed under name PIX™ and is used to stunt the plant tissue growth in cotton plants. Mepiquat chloride shortens internode vegetative length and final plant height. This growth stunting action allows growers to increase yields of cotton (the fruit of cotton plants).

Example 9 evaluates the efficacy of mepiquat chloride formulations with and without assimilation agent of the present invention.

The products tested were:

| (1) PIX ™ | 4.2% mepiquat chloride |
|---|---|
| (2) ML | 4.2% of a sodium-free form of mepiquat chloride |
| (3) MLK-12 | A formulation containing 3.56 fluid ounces ML and 0.44 ounces of assimilation agent prepared according to example 1 containing additional synthetic Krebs cycle acids (40–45 wt % acids). |
| (4) MLP | A formulated compound of 4 ounces of ML and 4 ounces of extract according to example 1. |

Plants were measured before and after application of the products. Each application was at an average of 14 initiated nodes above the cotyledon. The effects of this timing would have an influence upon internodes as low as number 10 above the cotyledon. Measurements from node 0, or cotyledon, to node 18 are listed in Tables 11, 12, and 13. Node number 18 was the last developed internode when the test ended at 14 days after treatment.

TABLE 11

| Treating Agent | Rate (ounces per acre) | Average Internode Length in Centimeters | | |
|---|---|---|---|---|
| | | Below Node 8 | Above Node 8 | Whole Plant |
| None | — | 4.8 | 4.3 | 4.5 |
| PIX ™ | 4 | 4.7 | 4.6 | 4.6 |
| PIX ™ | 8 | 5.0 | 4.2 | 4.6 |
| ML | 8 | 4.9 | 4.0 | 4.5 |
| MLK-12 | 4 | 5.3 | 4.1 | 4.6 |
| MLP | 8 | 4.8 | 4.1 | 4.4 |

As shown in Table 11, the preferred MLK-12 formulation according to the present invention was able to produce, at a 4 oz/acre rate, an average internode length above node 8 comparable to an 8 oz/acre rate of mepiquat chloride. These results mean that growers can use half of the regular 8 oz/acre application rate and achieve comparable results with a significantly reduced cost and environmental impact.

TABLE 12

| Agent | Rate (ounces/ acre) | Average Internode Length after Application (cm) | | | | | | | | Total Height change (cm) |
|---|---|---|---|---|---|---|---|---|---|---|
| | | #11 | #12 | #13 | #14 | #15 | #16 | #17 | #18 | |
| None | — | 7.3 | 5.3 | 4.5 | 4.0 | 5.0 | 3.5 | 2.3 | 0.9 | 32.8 |
| PIX ™ | 8 | 7.2 | 4.3 | 3.8 | 2.7 | 3.3 | 2.2 | 1.3 | 1.0 | 25.8 |
| PIX ™ | 4 | 6.5 | 4.8 | 5.0 | 3.2 | 3.5 | 3.7 | 1.5 | 1.0 | 29.2 |
| ML | 8 | 6.7 | 3.3 | 4.2 | 2.8 | 3.7 | 1.8 | 1.0 | 0.0 | 23.5 |
| MLK-12 | 4 | 6.5 | 3.7 | 3.2 | 2.8 | 2.7 | 1.3 | 0.7 | 0.0 | 20.9 |
| MLP | 8 | 6.0 | 5.0 | 4.0 | 2.8 | 3.8 | 2.2 | 1.5 | 0.8 | 26.1 |

From Table 12, the effect of the applied products can be seen on individual internode lengths. For instance, the 8 ounce application of PIX™ was more effective at stunting growth than the 4 ounce application yet the 4 ounce MLK-12 application was superior to any of the mepiquat chloride treatments. MLP had similar activity to MLK-12 yet not as pronounced nor at the lower application rate.

TABLE 13

| Agent | Rate (ounces per acre) | Height Node 0–8 (cm) | Node 8 and Above (cm) | Total Height |
|---|---|---|---|---|
| None | — | 38.8 | 44.8 | 83.6 |
| PIX ™ | 4 | 37.7 | 44.3 | 82.0 |
| PIX ™ | 8 | 40.3 | 38.0 | 78.3 |
| ML | 8 | 39.3 | 36.3 | 75.6 |
| MLK-12 | 4 | 42.2 | 36.5 | 78.7 |
| MLP | 8 | 38.0 | 39.7 | 77.7 |

Total effect upon plant height is listed in Table 13. The MLK-12 treatment, while not the shortest plant in total height, it and the ML treatment had significant height differences in the node 8 and above portion of the plant. Subsequent application of any of the treatments would have a further shortening effect.

It is evident that assimilation agent of the present invention have a positive effect on the performance of mepiquat chloride. The addition of 0.44 ounces of assimilation agent to 3.56 ounces of mepiquat chloride elicits the same and/or improved plant modification characteristics as does the standard 8 ounce/acre mepiquat chloride rate.

Example 10

Tomato cherry plants were treated in a greenhouse to compare the effects of synthetic carboxylic acids, alone and in a mixture, and assimilation agent containing 4.5–5.5% total polyhydroxycarboxylic acids expressed as trihydroxypentanedioic acid (CENERGY™). Foliar sprays were made every two weeks beginning when the 6th true leaf appeared. Each dose was at the corresponding rate of 3 pints per acre. The effects on total dry matter, yield, and nutrient uptake are shown in Tables 14–16. (Means within columns followed by the same letter are not significantly different at the 5% level of probability.)

TABLE 14

| | GRAMS OF DRY MATTER PER PLANT | | | |
|---|---|---|---|---|
| Treatment | Root | Meristems | Stem + Leaves | Total |
| Control | 1.3a | 2.8a | 21.7a | 25.8a |
| Glycolic acid | 1.3a | 1.7a | 15.9a | 18.9a |
| Malic acid | 1.1a | 2.3a | 19.7a | 23.1a |
| Citric acid | 0.9a | 3.1a | 15.6a | 19.6a |
| Succinic acid | 1.2a | 3.4a | 17.6a | 22.2a |
| Glutaric acid | 0.9a | 2.8a | 20.8a | 24.5a |
| Gluconic acid | 1.4a | 2.9a | 18.7a | 23.0a |
| assimilation agent | 1.5a | 3.4a | 22.1a | 27.0a |
| C.V. (%) | 26.2 | 22.3 | 17.7 | 17.3 |

The synthetic acids did not produce statistically significant results for plant dry matter. Arithmetically, treatment with synthetic acids exhibited adverse effects on dry matter in contrast to the extract of the present invention.

TABLE 15

| | YIELD | |
|---|---|---|
| Treatment | Fruit Weight/plant (g) | Number of Fruit/plant |
| Control | 152.5bc | 11.8ab |
| Glycolic acid | 131.4 c | 10.7ab |
| Malic acid | 135.4bc | 9.7 b |
| Citric acid | 147.3bc | 11.0ab |
| Succinic acid | 172.4bc | 13.3ab |
| Glutaric acid | 136.5bc | 9.7 b |
| Gluconic acid | 191.9 b | 14.0ab |
| assimilation agent | 251.2 a | 16.7 a |
| C.V. (%) | 23.7 | 20.1 |

Extract of the invention exhibited superior performance on fruit yield compared to all other treatments. The synthetic acid treatments were not statistically different from the control with the adverse exception of glycolic acid.

The extract was statistically better than malic and glutaric acid treatments for fruit setting, as measured by the number of fruit.

TABLE 16

| | NUTRIENT CONTENT (mg/plant) | | |
|---|---|---|---|
| Treatment | Ca | K | Mg |
| Control | 206.3bc | 749.4bc | 127.9bc |
| Glycolic acid | 171.0 c | 484.1 d | 95.5 d |
| Malic acid | 256.1ab | 734.9bc | 140.1bc |
| Citric acid | 213.2bc | 551.0cd | 114.7cd |

TABLE 16-continued

| Treatment | NUTRIENT CONTENT (mg/plant) | | |
|---|---|---|---|
| | Ca | K | Mg |
| Succinic acid | 257.4ab | 779.4 ab | 153.5ab |
| Glutaric acid | 280.9 a | 647.5bcd | 139.9bc |
| Gluconic acid | 279.1 a | 799.1 ab | 148.7ab |
| assimilation agent | 311.5 a | 957.1 gc | 174.3 a |
| C.V. (%) | 15.8 | 19.3 | 14.7 |

One nutrient uptake, the assimilation agent of the invention was statistically better than all treatments, except gluconic and succinic acid treatments. The extract was, however, numerically better than those treatments for all measured minerals. Glycolic acid exhibited an adverse effect on nutrient uptake.

Examples 11–20

Examples 11–20 compare the effect of synthetic ingredients against the assimilation agent of the invention. The specific treatments described in Table 17 include synthetic Krebs cycle acids alone and in combination, synthetic carbohydrates related to the Krebs cycle acids, and assimilation agent according to the invention.

TABLE 17

| Example | Description |
|---|---|
| 11 | Synthetic carboxylic acid mixture[1] |
| 12 | Synthetic carbohydrate mixture[2] |
| 13 | Glutaric acid |
| 14 | Synthetic carboxylic acid mixture + Synthetic carbohydrate mixture |
| 15 | Synthetic carboxylic acid mixture + Glutaric acid |
| 16 | Synthetic carboxylic acid mixture + Synthetic carbohydrate mixture + Glutaric acid |
| 17 | Oxidized seed hull extract + Glutaric acid |
| 18 | Oxidized seed hull extract + Gluconic acid |
| 19 | Oxidized seed hull extract |
| 20 | Control |

[1]Synthetic carboxylic acid mixture includes glycolic acid, glyceric acid, and xylonic acid.
[2]Synthetic carbohydrate mixture includes xylose, arabinose, glucose, mannose, and galactose.

Soybeans were planted in a 6–8 mesh substrate in 250 ml pots. After soaking in 1:500 dilutions of each treatment, the pots were arranged in trays filled with a nutrient solution. After 14 days, the roots were removed and measured for length, the number of secondary roots, and dry weight. Six replications were performed. Table 18 reports the results.

TABLE 18

| Example | Main Root Length (cm/plant) | Secondary Roots (number/plant) | Dry Weight (mg/plant) |
|---|---|---|---|
| 11 | 18.75 | 99.5bcd | 63.5 |
| 12 | 18.69 | 92.6 cd | 57.8 |
| 13 | 20.67 | 100.3 bc | 43.3 |
| 14 | 17.25 | 91.7 cd | 46.7 |
| 15 | 18.42 | 87.3 d | 52.5 |
| 16 | 18.17 | 90.3 cd | 58.2 |
| 17 | 21.50 | 119.3 a | 58.2 |
| 18 | 19.40 | 101.0 bc | 45.0 |
| 20 (Control) | 18.80 | 99.0 cd | 57.4 |

Examples 11–20 show that the plant metabolism is advantageously activated by the present assimilation agent as compared to synthetic acids and carbohydrates. Better results are generally shown for dry matter, fruit weight, number of secondary roots, and higher nutrient uptake. These effects are related to the activation of a pentose phosphate pathway plant metabolism which, while not wishing to be bound by theory, is believed to be the most probable process for the enhanced assimilation of herbicides, pesticides, and plant growth regulators.

Examples 21–25

Examples 21–25 show the enhanced uptake of sulfonylurea type herbicides. These herbicides belong to the latest generation of compounds widely used in grain crops. The application rates used are generally low due to the potential for crop damage as well as high cost. Table 19 shows the effects of the present invention on these herbicides when used on corn.

TABLE 19

| Example | Material | Application Rate | Crop Injury | Cokel Bur Weed (control %) | Velvet Leaf Weed (control %) |
|---|---|---|---|---|---|
| 21 | Pinnacle ™ Classic ™ Surfactant 28% N | 0.004 lb/A 0.004 lb/A 0.15% v/v 4% v/v | 0 | 88.7 | 99 |
| 22 | Pinnacie ™ Classic ™ 28% N | 0.002 lb/A 0.002 lb/A 4% v/v | 0 | 50 | 66 |
| 23 | Pinnacle ™ Classic ™ assimilation agent 28% N | 0.002 lb/A 0.002 lb/A 0.25% 4% v/v | 0 | 88 | 99 |
| 24 | Pursuit ™ Sunit ™ 28% N | 0.031 lb/A 1.5 pt/A 1 qt/A | 3 | 80 | 95 |
| 25 | Pursuit ™ assimilation agent | 0.031 lb/A 0.25% v/v | 1 | 80 | 92 |

Pinnacle ™ is based on the herbicide commonly known as thifensulfuron methyl (CAS No. 79277-27-3).
Classic ™ contains the herbicide chlorimuron ethyl (CAS No. 90982-32-4).
Pursuit ™ includes the herbicide imazethapyr (CAS No. 81334-34-1).
Sunit ™ is a methylated seed oil spray adjavant The results in Table 19 show that the addition of the assimilation agent of the present invention to Pinnacle™ (ex. 23) permits a 50% reduction in the application rate without loss of efficacy as occurs when the rate is reduced by 50%. Compare examples 21 and 22. The crop injury effects were also diminished by the addition of the present assimilation agent. Compare examples 24 and 25.

Example 26–27

Black sigatoka (*Mycosphaerella fijensis var difformis*) is an economically devastating fungus disease on bananas. Calixin (AI: tridemorph, CAS No. 81412-43-3) is widely used to control the fungus as a systemic fungicide although its main effect is by contact due to the limited effectiveness of systemic fungicides in banana leaves. Extract of the present invention was used to determine whether the fungicide could exhibit more systemic effects. Table 20 has the results.

TABLE 20

| Example | Ingredient | Rate | Active Spots (%) 4 days | Active Spots (%) 8 days | Youngest Leaf Infected |
|---|---|---|---|---|---|
| 26 | Calixin ™ | 8 oz/A | 56.7 | 54.3 | 6 |
|  | Citroline ™ | 14 oz/A |  |  |  |
|  | Surfactant | 0.15% v/v |  |  |  |
| 27 | Calixin ™ | 8 oz/A | 4.5 | 11.3 | 7 |
|  | Citroline ™ | 14 oz/A |  |  |  |
|  | Surfactant | 0.15% v/v |  |  |  |
|  | assimilation agent | 0.20% v/v |  |  |  |

Calixin ™ is a systemic fungicide based on tridemorph (CAS No. 81412-43-3).
Citroline ™ is Petrolem distillate With the assimilation agent of the invention, disease control is significantly improved at 4 days after application (92% better) and at 8 days after application (79% better). A higher result of "youngest leaf infected" is related to a harvest season with a higher number of leaves.

It will be understood that the preceding examples are intended to serve as an aid to the understanding of the present invention. Specific details of the examples are not intended to serve as limitations on the scope of the following claims.

We claim:

1. A composition comprising:
   (a) an assimilation agent comprising an oxidized extract obtained by a process comprising:
      i. contacting pentosan-containing seed hulls with nitric acid to hydrolyze pentosan polymers in said hulls to form a pentose-containing extract;
      ii. injecting steam into the mixture of pentose-containing extract and hull solids to agitate said mixture while oxidizing at least in part the pentoses into polyhydroxycarboxylic acids in a first oxidized extract stream;
      iii. separating the seed hull solids from the partially oxidized extract stream to make a clarified product;
      iv. contacting the clarified product with additional nitric acid to oxidize at least in further part the pentoses in said first oxidized extract stream into a second oxidized product stream containing a blend of carbohydrates and polyhydroxycarboxylic acids; and
      v. concentrating the second oxidized product stream to produce a concentrated product containing polyhydroxycarboxylic acids and carbohydrates related thereto; and
   (b) an active ingredient containing a plant growth regulating agent, systemic fungicide, or a systemic insecticide for plants.

2. A composition in claim 1 wherein said active ingredient is selected from the group consisting of at least one of the gibberillins; sodium ortho-nitrophenolate; sodium para-nitrophenolate; sodium 5-nitro-guaicolate; a growth stunting amount of mepiquat chloride; a lethal amount of either glyphosate or sulfosate; and a sulfonyl-urea herbicide.

3. A composition as in claim 1 wherein said active ingredient comprises gibberellic acid, 3-indolebutyric acid, or combinations thereof.

4. A composition as in claim 1 wherein said active ingredient comprises tridemorph as a systemic fungicide.

5. A composition as in claim 1 wherein said active ingredient comprises aldicarb as a systemic insecticide.

6. A method for affecting the growth of plants by a process comprising:

applying to external surfaces of a plant a growth regulating amount of a composition comprising:
   (a) an assimilation agent made by a process comprising:
      i. contacting pentosan-containing seed hulls with nitric acid to hydrolyze pentosan polymers in said hulls to form a pentose-containing extract;
      ii. injecting steam into the mixture of pentose-containing extract and hull solids to agitate said mixture while oxidizing at least in part the pentoses into polyhydroxycarboxylic acids in a first oxidized extract stream;
      iii. separating the seed hull solids from the partially oxidized extract stream to make a clarified product;
      iv. contacting the clarified product with additional nitric acid to oxidize at least in further part the pentoses in said first oxidized extract stream into a second oxidized product stream containing a blend of carbohydrates and derived polyhydroxycarboxylic acids; and
      v. concentrating the second oxidized product stream to produce a concentrated product containing polyhydroxycarboxylic acids and carbohydrates related thereto; and
   (b) an active ingredient containing a amount of a plant growth regulating agent effective to affect the growth rate of the treated plant.

7. A method as in claim 6 wherein the applying step comprises:

applying an assimilation agent made by a process consisting essentially of:
   i. contacting seed hulls with 4–6% nitric acid to hydrolyze pentosan polymers in said hulls to form a pentose-containing extract;
   ii. agitating said extract with steam at a temperature within the range of 75°–85° C. for 8–20 hours to oxidize pentoses within said extract to form polyhydroxycarboxylic acids in said first oxidized extract stream;
   iii. separating the seed hull solids from the aqueous extract;
   iv. contacting the aqueous extract with additional nitric acid to at least partially oxidize the extract into a dilute partially oxidized product stream containing a blend of carbohydrates and derived polyhydroxycarboxylic acids; and
   v. concentrating the dilute partially oxidized product stream by vacuum distillation at a temperature of no more than 60° C. to produce a concentrated assimilation agent.

8. A method as in claim 6 wherein the applying step comprises applying a growth stunting amount of mepiquat chloride.

9. A method as in claim 6 wherein the applying step comprises applying a plant growth enhancing amount of at least one of the gibberillins.

10. A method as in claim 6 wherein the applying step comprises applying said assimilation agent and a plant growth regulating agent comprising an active ingredient selected from the group consisting of at least one of the gibberillins; sodium orthonitrophenolate; sodium para-nitrophenolate; sodium 5-nitro-guaicolate; a growth stunting amount of mepiquat chloride; a lethal amount of either glyphosate or sulfosate.

11. A method for protecting plants against predatory insects by a process comprising:

applying to external surfaces of a plant an insecticidally effective amount of a composition comprising:

(a) an assimilation agent made by a process comprising:
  i. contacting pentosan-containing seed hulls with nitric acid to hydrolyze pentosan polymers in said hulls to form a pentose-containing extract;
  ii. injecting steam into the mixture of pentose-containing extract and hull solids to agitate said mixture while oxidizing at least in part the pentoses into polyhydroxycarboxylic acids in a first oxidized extract stream;
  iii. separating the seed hull solids from the partially oxidized extract stream to make a clarified product;
  iv. contacting the clarified product with additional nitric acid to oxidize at least in further part the pentoses in said first oxidized extract stream into a second oxidized product stream containing a blend of carbohydrates and derived polyhydroxycarboxylic acids; and
  v. concentrating the second oxidized product stream to produce a concentrated product containing polyhydroxycarboxylic acids and carbohydrates related thereto; and
(b) an active ingredient containing a amount of a systemic insecticide effective to kill insects feeding on plant tissues.

12. A method as in claim 11 wherein the applying step comprises:
  applying an assimilation agent made by a process consisting essentially of:
    i. contacting seed hulls with 4–6% nitric acid to hydrolyze pentosan polymers in said hulls to form a pentose-containing extract;
    ii. agitating said extract with steam at a temperature within the range of 750°–85° C. for 8–20 hours to oxidize pentoses within said extract to form polyhydroxycarboxylic acids in said first oxidized extract stream;
    iii. separating the seed hull solids from the aqueous extract;
    iv. contacting the aqueous extract with additional nitric acid to at least partially oxidize the extract into a dilute partially oxidized product stream containing a blend of carbohydrates and derived polyhydroxycarboxylic acids; and
    v. concentrating the dilute partially oxidized product stream by vacuum distillation at a temperature of no more than 60° C. to produce a concentrated assimilation agent.

13. A method as in claim 11 wherein the applying step comprises: applying an active ingredient comprising aldicarb.

14. A method for protecting plants against fungus by a process comprising:
applying to external surfaces of a plant fungicidally effective amount of a composition comprising:
(a) an assimilation agent made by a process comprising:
  i. contacting pentosan-containing seed hulls with nitric acid to hydrolyze pentosan polymers in said hulls to form a pentose-containing extract;
  ii. injecting steam into the mixture of pentose-containing extract and hull solids to agitate said mixture while oxidizing at least in part the pentoses into polyhydroxycarboxylic acids in a first oxidized extract stream;
  iii. separating the seed hull solids from the partially oxidized extract stream to make a clarified product;
  iv. contacting the clarified product with additional nitric acid to oxidize at least in further part the pentoses in said first oxidized extract stream into a second oxidized product stream containing a blend of carbohydrates and derived polyhydroxycarboxylic acids; and
  v. concentrating the second oxidized product stream to produce a concentrated product containing polyhydroxycarboxylic acids and carbohydrates related thereto; and
(b) an active ingredient containing a amount of a systemic fungicide effective to kill fungus on plant tissues.

15. A method as in claim 14 wherein the applying step comprises:
  applying an assimilation agent made by a process consisting essentially of:
    vi. contacting seed hulls with 4–6% nitric acid to hydrolyze pentosan polymers in said hulls to form a pentose-containing extract;
    vii. agitating said extract with steam at a temperature within the range of 75°–85° C. for 8–20 hours to oxidize pentoses within said extract to form polyhydroxycarboxylic acids in said first oxidized extract stream;
    viii. separating the seed hull solids from the aqueous extract;
    ix. contacting the aqueous extract with additional nitric acid to at least partially oxidize the extract into a dilute partially oxidized product stream containing a blend of carbohydrates and derived polyhydroxycarboxylic acids; and
    x. concentrating the dilute partially oxidized product stream by vacuum distillation at a temperature of no more than 60° C. to produce a concentrated assimilation agent.

16. A method as in claim 14 wherein the applying step comprises: applying an active ingredient comprising tridemorph.

* * * * *